United States Patent [19]

Gaudin et al.

[11] Patent Number: 5,087,361
[45] Date of Patent: Feb. 11, 1992

[54] FILTER FLOOR NOZZLE HOUSING AND SUPPORT ARRANGEMENT

[75] Inventors: Marie-Pierre Gaudin, Saint Germain en Laye; Marc Gilet, Puteaux; Alain Motte, Bougival, all of France

[73] Assignee: Degremont, Rueil-Malmaison Cedex, France

[21] Appl. No.: 459,601

[22] Filed: Jan. 2, 1990

[30] Foreign Application Priority Data

Jan. 9, 1989 [FR] France .................. 89 00157

[51] Int. Cl.⁵ .................. B01D 24/12; B05B 15/06
[52] U.S. Cl. .................. 210/293; 52/220;
52/601; 52/606; 210/541; 239/276; 239/600;
248/75
[58] Field of Search .................. 52/220, 600, 606, 601;
210/289, 291, 293, 541, 542; 239/600, 271, 273,
276; 264/86, DIG. 48; 248/75, 544

[56] References Cited

U.S. PATENT DOCUMENTS

| | | | |
|---|---|---|---|
| 3,081,877 | 3/1963 | Jakobs et al. | 210/293 |
| 3,456,804 | 7/1969 | McGivern | 210/293 |
| 3,498,462 | 3/1970 | Larrowe et al. | 210/293 |
| 4,084,750 | 4/1978 | Fett | 239/600 |
| 4,579,659 | 4/1986 | Eades et al. | 210/293 |
| 4,683,690 | 8/1987 | Rollin et al. | 52/220 |
| 4,856,754 | 8/1989 | Yokota et al. | 264/86 |
| 4,925,556 | 5/1990 | Gaudin et al. | 210/293 |

FOREIGN PATENT DOCUMENTS

| | | | |
|---|---|---|---|
| 19655 | 12/1980 | European Pat. Off. | 210/293 |
| 145238 | 6/1985 | European Pat. Off. | 239/DIG. 19 |
| 1044037 | 5/1959 | Fed. Rep. of Germany | 210/293 |
| 1154792 | 4/1964 | Fed. Rep. of Germany | 210/293 |
| 1405568 | 12/1965 | France | 210/293 |
| 2596385 | 10/1987 | France | 210/293 |

*Primary Examiner*—Robert A. Dawson
*Assistant Examiner*—Joseph Drodge
*Attorney, Agent, or Firm*—Pollock, Vande Sande & Priddy

[57] ABSTRACT

Apparatus for setting in position and securing, on the floor of a filter, members providing for fluid to flow through the floor. The apparatus consists of a support arranged so as to receive the member, such as a nozzle or equivalent, introduced inside a housing created in shuttering used for making the filter floor. The housing and the support are configured to removably secure mechanically, for example by a snap-in action, the support in its housing.

6 Claims, 1 Drawing Sheet

FILTER FLOOR NOZZLE HOUSING AND SUPPORT ARRANGEMENT

FIELD OF THE INVENTION

The invention relates to a apparatus for positioning and securing, on the floor a filter, of members which provide for the passage of fluid through the floor.

The invention is mainly but not exclusively intended for use with granular filtration material used for the treatment of waters.

BACKGROUND OF THE INVENTION

For efficient utilization of a water treatment filter, it is indispensable to provide an efficient mode for washing the filtration material or materials. The washing modes used up to now require a well distributed introduction of washing fluids, which are generally air and water, within the filtration mass.

For a better spreading and equidistribution, of the washing fluids one may use strainers or nozzles which are usually mounted inside the structure for supporting the filtration material. This structure, called a floor, can be in particular formed of reinforced concrete, in which case the arrangement of the cavities formed in the floor for housing the nozzles requires, during the preparation of the fllor, delicate and numerous interventions. In a general manner, the hole intended for receiving the nozzle fixation member can be made by setting in position small size devices, which may be made of steel, adapted for removed when the concrete has set, and then meticulously cleaned in order to be used again, or discarded. Moreover, the adjustment and emplacement of these elements require a lot of attention and care.

OBJECTS AND SUMMARY OF THE INVENTION

The present invention relates to apparatus made of parts which are formed of plastic material, and are easily assembled, simplifying to the maximum the making of a filter floor having nozzles.

This device consists substantially of a support, arranged so as to receive the nozzles or equivalent, which is introduced inside a housing formed in the hidden shuttering used for making the filter floor, the housing and the support being configured so as to provide mechanically for removably securing, for example by a snap-in arrangement, the support in its housing.

The various features and advantages of the invention will become more apparent from the reading of the following description of one of its possible embodiments, given only by way of a non-limiting example.

BRIEF DESCRIPTION OF DRAWINGS

For this description, reference is made to the accompanying drawings wherein.

DETAILED DESCRIPTION OF THE INVENTION

Figure 1:
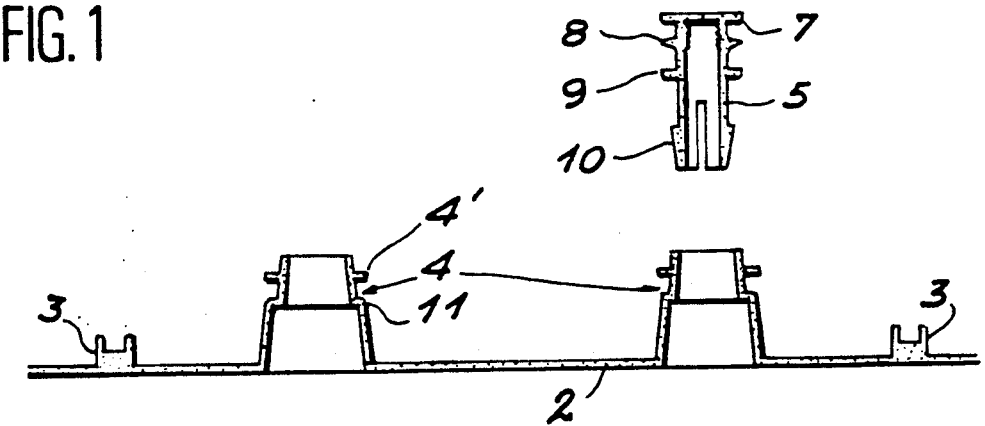
FIG. 1 is a general view showing the constituent elements of the apparatus.
Figure 2:
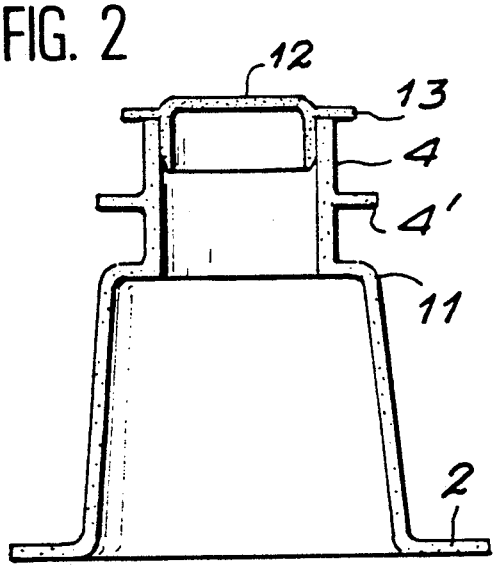
FIG. 2 shows on a larger scale the housing for the nozzle support, provided with its plug.
Figure 3:
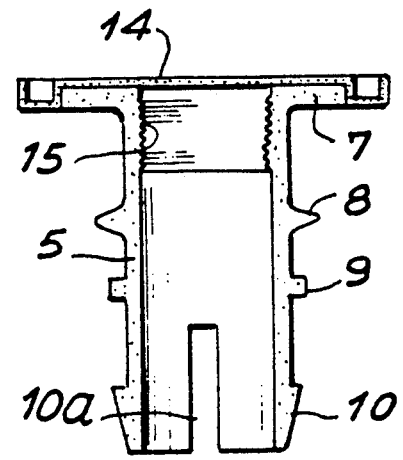
FIG. 3 shows in a similar manner as FIG. 2 the nozzle support with its plug.
Figure 4:
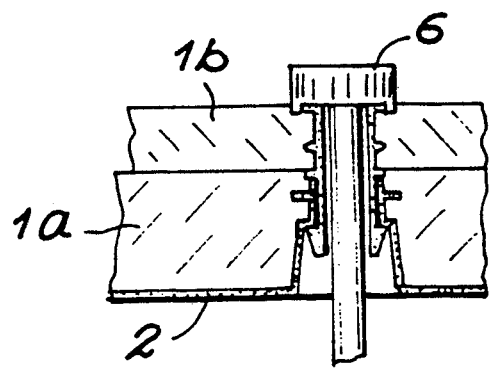
FIG. 4 shows a nozzle in position on the device once the floor is complete.

The embodiment described herein relates to the case where the filter floor is made according to the method which is the object of U.S. patent application Ser. No. 07/294,113 filed on Jan. 6, 1989, now U.S. Pat. No. 4,925,556 it being understood that the invention can be applied to any floor obtained in a different manner.

In this example, the filter floor is made, during its first phase, of at least a pre-slab formed by casting a so-called "first phase" concrete 1a over a shuttering made in general of a plurality of elements 2 of a plastic material such as polystyrene, provided with reinforcing guides 3.

According to the invention, each element 2 is configured so as to create housings 4 of a frustoconical shape, regularly distributed about the floor and including a rib 4' for anchoring in the concrete.

The supports 5 for the nozzles 6 are introduced into the housings. Each support 5, of a generally cylindrical shape, is formed successively, starting at its upper end, with a flange 7 which supports the head of the nozzle, a rib 8 for anchoring support 5 in the concrete, an abutment 9 for stopping downward movement of the support on the edge of its housing, and finally a projection 10 adapted to engage a shoulder 11 of housing 4 so as to provide a snap-in system for removably securing support 5 in its housing 4, the removability being obtained in the present embodiment by slots 10a which are formed in the lower portion of support 5 and increasing the flexibility of projection 10.

After the first phase concrete is cast housing 4, is covered by a plug 12, a surface of which is flush with the first phase concrete. The plug 12 is formed with a flange 13 which leaves an imprint in the first phase concrete where the annular abutment 9 provided for stopping downward movement of the nozzle support 5 comes to rest.

Similarly, when the "second phase" concrete 1b is being cast, nozzle support 5 is provided with a plug 14 having a broadened head and configured to create an imprint in the concrete, for receiving the nozzle head.

The apparatus according to the invention is carried into effect in the following manner:

The elements of the shuttering of the pre-slab being put in position, the first phase concrete 1a is cast so as to form the pre-slab, after the housing openings have been closed with plugs 12.

Once the concrete has set, one introduces the supports 5 in their housings 4, without the necessity of using an intermediate seal, because of the imprint left in the concrete by the plug flange 13.

Then, one proceeds to mounting the supports 5 in their housings 4 by pressing on the supports to snap-in engage each support in its housing.

The supports being provided with their plugs, the second phase concrete 1b is being cast in one pour so as to complete the filter floor.

Once this concrete has set, the plugs are removed from the nozzle supports and the nozzles are fixed by simply screwing their shanks, formed with a threading (not shown), on the support, which is tapped at 15 in a corresponding manner, without the necessity of interposing a tight seal due to the inprint left in the concrete by the support plug head which is specially configure to form an impression in which is received the peripheral edge of the nozzle head.

When the reinforced concrete filter floor is made in a single casting phase, the elements of the shuttering are provided with nozzle supports prior to their being brought to the working site. The supports are fitted out with plus at their upper portion and the shuttering bottoms receive the reinforcing for the concrete slab. The reinforcements are placed, according to requirements, on the supports of the slab. The easy cutting or juxtaposition of the components allows covering of the totality of the surface, whatever that surface may be. On these elements, the concrete is cast in one single operation and without any other preparation, so as to form the filter floor in a simple manner and without any other intervention.

The apparatus according to the invention solves in a simple and economic way the problem of mounting and securing nozzles or similar elements on a filter floor.

Indeed, the assembly of the components forming the apparatus reduces considerably the number of tasks which are necessary during the construction, and the means used simplify the assembly operations. The preliminary and intermediate phases for setting in position the means in order to create the cavities intended for receiving the nozzles are omitted.

The apparatus according to the invention eliminates the positioning, wedging and setting operations for the members intended for receiving the nozzles. The formation of the holes necessary for positioning the nozzle supports is done automatically during the casting of the reinforced concrete floor. The nozzle support is directly introduced inside its housing without any cleaning operation.

The mechanism used for securing the nozzles on their supports permits a very easy assembly and disassembly of these parts. Because of a mechanical snap-in engagement, the nozzle support is instantaneously established as being level; the assembly tolerances are sufficiently fine so as not to impede in any way the spreading and distribution functions of the washing fluids.

Moreover, the materials chosen and the machining for the parts improve the adherence and anchoring of the elements in the reinforced concrete, thereby reducing advantageously any disassembly hazards. Finally, the design of the parts allows a simple and flexible nesting of the elements into each other, thereby providing a definite advantage in their transportation and handling.

We claim:

1. Apparatus constructed and arranged for placing and securing within a filter floor fluid passageway means for transporting fluid through said floor, said floor including a lower layer of shuttering and an upper layer of concrete, said apparatus comprising:

a plurality of housings integrally formed in said shuttering, each of said housings providing a substantially vertically-extending passageway and comprising a lower hollow truncated portion extending upwardly from said shuttering, a hollow substantially cylindrical portion extending upwardly from said truncated portion, and internal shoulder means providing a transition portion between said truncated and cylindrical portions;

a nozzle support member adapted for insertion within each of the passageways of said housings, each nozzle support member comprising a substantially cylindrical member having an axially aligned fluid passageway, an upper end for supporting nozzle means, and notch means in the outer surface of said cylindrical member at a lower portion thereof, said notch means being adapted for releasably engaging the internal shoulder of said housing; and, nozzle means secured to the respective upper end of each of said nozzle support members.

2. Apparatus according to claim 1 wherein said nozzle support members include an annular protrusion forming an abutment for bearing on the upper end of the cylindrical portion of the respective housings and a flange at said respective support member's upper end for supporting said respective nozzle means.

3. Apparatus according to claim 2 wherein each of said housings are adapted to support a substantially cylindrical plug for covering its passageway when concrete is being poured, said plugs having a cylindrical edge for leaving an impression in the concrete for receiving the annular protrusions of said nozzle support members.

4. Apparatus according to claim 2 wherein said nozzle support members are each provided with a plug configured to form in concrete an impression conforming to a peripheral edge of said respective nozzle means.

5. Apparatus according to claim 1 wherein the lower portion of each of the nozzle support members are provided with an axially-extending slot for increasing the radial flexibility of the notch means.

6. Apparatus according to claim 1 wherein said housings and said nozzle support members are each provided with at least one circumferentially extending rib for anchoring said housings and said nozzle support members in said concrete.

* * * * *